United States Patent [19]

Takada

[11] Patent Number: 4,772,105
[45] Date of Patent: Sep. 20, 1988

[54] GRADED REFRACTIVE INDEX LENS SYSTEM

[75] Inventor: Katsuhiro Takada, Tokyo, Japan

[73] Assignee: Olympus Optical Co., Ltd., Tokyo, Japan

[21] Appl. No.: 126,921

[22] Filed: Nov. 30, 1987

Related U.S. Application Data

[63] Continuation-in-part of Ser. No. 852,712, Apr. 16, 1986, abandoned.

[30] Foreign Application Priority Data

Apr. 18, 1985 [JP] Japan ............................. 60-81357

[51] Int. Cl.⁴ .......................... G02B 3/02; G02B 13/18
[52] U.S. Cl. ....................................... 350/413; 350/432
[58] Field of Search ................................ 350/413, 432

[56] References Cited

U.S. PATENT DOCUMENTS

| | | | |
|---|---|---|---|
| 4,449,792 | 5/1984 | Arai et al. | 350/432 |
| 4,457,590 | 7/1984 | Moore | 350/413 |
| 4,600,276 | 7/1986 | Bietry | 350/432 |
| 4,655,556 | 4/1987 | Kajitani | 350/432 |
| 4,668,055 | 5/1987 | Nishi et al. | 350/432 |
| 4,671,623 | 6/1987 | Chikuma | 350/432 |
| 4,721,369 | 1/1988 | Hattori et al. | 350/413 |

Primary Examiner—Bruce Y. Arnold
Assistant Examiner—Terry S. Callaghan
Attorney, Agent, or Firm—Cushman, Darby & Cushman

[57] ABSTRACT

A graded refractive index (GRIN) lens that is compact and light in weight comprising two refracting surfaces having positive powers respectively, at least one refracting surface being formed aspherically, thereby enabling to have spherical aberration, coma, astigmatism, etc., well-corrected while securing a sufficiently large working distance.

16 Claims, 8 Drawing Sheets

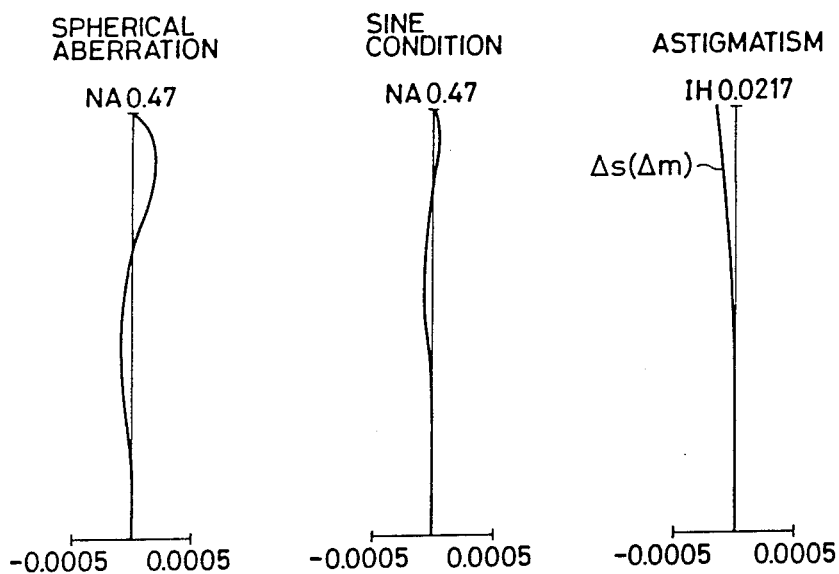
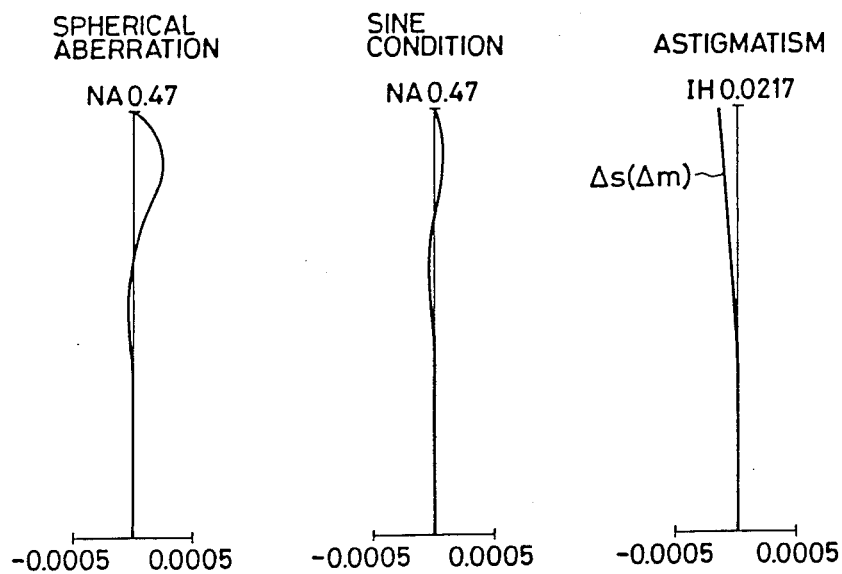

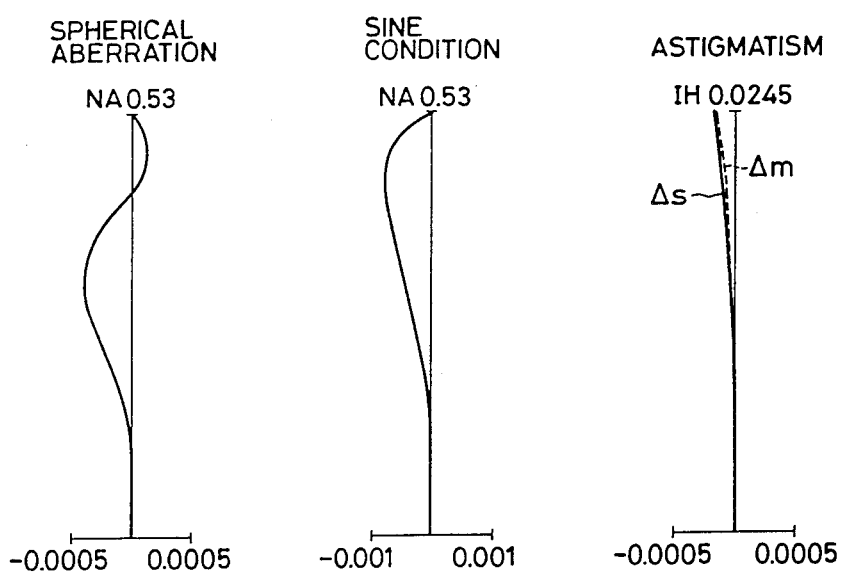

GRADED REFRACTIVE INDEX LENS SYSTEM

This application is a continuation-in-part my application, Ser. No. 852,712 filed on Apr. 16, 1986 now abandoned.

BACKGROUND OF THE INVENTION (a) Field of the Invention:

The present invention relates to a lens used for the recording and playing back of optical disks, etc., especially a graded refractive index (GRIN) lens.

(b) Description of the Prior Art:

In an objective lens system used for the recording and playing back of information which is recorded with high density on recording medium such as optical disks, etc., it is necessary to have resolving power of about 1 μm.

An objective lens system of the above mentioned kind employs an arrangement wherein a lens system itself is directly driven for the purpose of autofocusing and tracking and, therefore, it is necessary for the lens system to be as compact and light as possible.

In order to improve the resolving power of a lens system, which is one of the necessities as mentioned above, it is enough to sufficiently correct only axial aberration because the optical disk makes use of the axial image point of an optical system. In view of the directional error of the incident ray flux or the influence of decentering by errors generated in the setting up of the lens, it is desirable to sufficiently correct aberration in the range of diameters of no less than about 0.2 mm from the optical axis as a center on the image surface.

If the lens system satisfying the above mentioned condition comprises spherical homogeneous lenses, the lens system will have to be a combination of a plurality of lenses and the length of the lens system will accordingly be long.

In recent years, a plastic lens both surfaces of which are formed aspherically has been developed and there has been seen remarkable progress in the related technology from the viewpoint of making the lens system compact and light.

On the other hand, for economy of manufacture and for reduction of size and weight, the lens systems in which a GRIN lens is employed have been reported. In these GRIN lens systems, at least one refracting surface is formed spherically so that aberrations are corrected.

The reported GRIN lens systems include the lens system disclosed in Japanese Published Unexamined patent application No. 6354/80 in which only spherical aberration is corrected. In the lens system disclosed in Japanese Published Unexamined patent application No. 62815/84, consideration is also given to the correction of off-axial coma aberration and the system is arranged to keep the necessary working distance. However, because the shape of the lens is strongly meniscus, the designed working distance cannot be secured in practice. In order to secure the practical working distance, the desired lens shape should be a biconvex lens. The lens system disclosed in Japanese Published Unexamined patent application No. 122512/83 involves a system comprising a biconvex lens, in which the correction of aberration, however, cannot be said to be on the level of practical use. In the lens system disclosed in the latter two prior art references, as for the correction of off-axial aberrations, only that of coma (sine condition) is taken into account. In order to obtain the lens system having wide visual field, etc., it is also necessary to sufficiently correct astigmatism.

SUMMARY OF THE INVENTION

It is a primary object of the present invertion to provide a graded refractive index (GRIN) lens which is compact and light and in which the necessary working distance is sufficiently secured, and spherical aberration, coma and astigmatism etc. are well corrected.

The GRIN lens according to the present invention has the refractive index distribution which is cylindrically symmetric to the optical axis and is expressed by the formula given below, and has the two refracting surfaces having positive refracting powers respectively at least one of which is formed aspherically:

$$n = n_0 + n_1 r^2 + n_2 r^4 + \ldots$$

where $n_0$ represents the refractive index on the optical axis of the lens, r represents the radial distance from the optical axis, and $n_1$, $n_2$, ... respectively represent the 2nd-, 4th-, ... order coefficients of the refractive index distribution.

As is well known, in the GRIN rod lens, high-order coefficients of the refractive index distribution are arranged so that it is possible to correct spherical aberration. In order to correct spherical aberration and sine condition while keeping the necessary working distance, it is necessary to form both the surfaces of the lens spherically. However, if the radii of curvatures of both the refracting surfaces, the length of the lens and the refractive index distribution are arranged to correct also astigmatism, the length of the lens will inevitably become long. In such a case, in order to keep the necessary working distance, it will be necessary to make the lens itself very large to the extent that it may lack utility.

In a lens used for the recording and playing back of optical disks, in order to obtain the lens having a wide visual field and a wide aperture, it is necessary to correct not only spherical aberration and coma but also astigmatism. However, when both refracting surfaces of the GRIN lens are merely made to be spherical, it will become necessary to make the thickness of the lens large and form the lens to be biconvex. In this case, it will be impossible to enlarge the working distance WD.

Therefore, in order to secure the necessary working distance and satisfy the above requirements, the first refracting surface should be aspherical. But, when the surface used in a conventional aspherical single lens is employed for the GRIN lens, the effect of the aspherical surface will become strong so that the employment of the GRIN lens does not produce a sufficient effect. In order to attain the above-mentioned object of the present invention by the production of both the effect brought by the employment of the aspherical surface and the effect of the refractive index distribution, it is necessary not only to combine both effects together but also to adopt a new lens configuration.

Astigmatism is determined by the basic shape of the lens, for example, the radius of curvature near the vertex of the refracting surface and the length of the lens, and by the low-order coefficients $n_0$, $n_1$ of the refractive index distribution. At first, when $n_0$ is determined, the basic shape of the lens and the coefficient $n_1$ of the refractive index distribution are arranged so that the focal length of the lens, the working distance and astigmatism are corrected. There are then a number of alternative solutions. If the solution where spherical aberration and sine condition are best-corrected is chosen from among them and the residual aberrations are, moreover, attempted to be corrected, it will not be possible to correct both the spherical aberration and sine condition well only by the arranging of the high-order coefficients of the refractive index distribution because of lack of freedom on the correction of aberrations. This freedom can be obtained by having at least one of the refracting surfaces of the lens formed aspherically.

When at least one refracting surface of the lens is formed aspherically, it will then be possible to correct spherical aberration, sine condition and also astigmatism, and to obtain the lens having sufficient working distance.

In the above case, between the two refracting surfaces, it is advantageous to form aspherically the incident side surface, i.e., the refracting surface farther from the disk. If aberrations are corrected by forming only the exit side surface aspherically, the high-order coefficients in the expansion representing the shape of the aspherical surface will become extraordinarily large, which results in a shape of the lens surface involving difficulties in manufacture.

With the lens configuration as mentioned above, a GRIN lens attaining the object of the present invention can be obtained. It is, however, desirable to satisfy the following condition:

$$d/f < 2.8$$

Where d represents the thickness of the lens and f represents the focal length of the lens.

This condition is necessary for securing a sufficient working distance. If this condition is not satisfied while aberrations are well-corrected, the working distance will become small and the lens will become unsuitable for practical use.

Unlike a homogeneous lens, a GRIN lens comprises a medium which itself has a refracting power. In order to correct aberrations well, it is necessary to arrange satisfactorily both the refracting power of the refracting surface and that of the medium.

In the case where the refracting power of the medium used for the GRIN lens is positive, it will be important that light rays are not made to be refracted strongly on the first refracting surface of the lens but made to be curved gradually in the medium to thereby suppress the generation of aberrations and obtain the large working distance.

For that reason, it is necessary to satisfy the following conditions (1), (2) and (3):

$$0 < (n_0 - 1)f/r_1 < 0.4 \quad (1)$$

$$0.38 < -(n_0 - 1)f/r_2 < 0.65 \quad (2)$$

$$-0.3 < n_1 f^2 < -0.1 \quad (3)$$

where, $n_0$ represents the refractive index at the center of the GRIN lens, $n_1$ represents the coefficient of the refractive index distribution, $r_1$, $r_2$ respectively represent the radii of curvatures of the object side refracting surface and the image side refracting surface thereof and f represents the focal length thereof.

These conditions (1), (2) and (3) define the refracting powers of the object side refracting surface, image side refracting surface and the medium, respectively. Each of the upper limits of the conditions (1) and (2) and the lower limit of the condition (3) is established to prevent these powers thereof from becoming excessively strong. And, each of the lower limits of the conditions (1) and (2) and the upper limit of the condition (3) is established to prevent these powers thereof from becoming excessively weak.

If the ranges of these conditions (1), (2) and (3) are exceeded, it will be impossible to effect a balance among the refracting powers of the respective refracting surfaces and the refracting power of the medium. Therefore, the correction of aberrations will become difficult and it will become impossible to keep a sufficient working distance.

On the other hand, in the case where the GRIN lens having a negative refracting power of the medium thereof is employed, in order to enlarge the height of the exit rays from the second refracting surface thereof to thereby enlarge the working distance and in order to correct respective aberrations with good balance, it will be necessary to set the refracting powers of the first refracting surface, the medium and the second refracting surface thereof to be positive, negative and positive, respectively. For that reason, it is necessary to satisfy the following conditions (4), (5) and (6):

$$0.9 < (n_0 - 1)f/r_1 < 1.3 \quad (1)$$

$$0.25 < -(n_0 - 1)f/r_2 < 0.7 \quad (2)$$

$$0.1 < n_1 f^2 < 0.4 \quad (3)$$

The condition (4) is established to make the refracting power of the first refracting surface strong to thereby generate negative spherical aberration. If the lower limit of this condition is exceeded, the generation of negative spherical aberration will be insufficient. If the upper limit thereof is exceeded, the positive refracting power of the first refracting surface will become excessively strong and will be ill-balanced with the refracting powers of the medium and the second refracting surface. Especially, when the refracting power of the medium is made to be strong in order to be balanced among them, the upper limit of the condition (6) will be exceeded and the refracting power of the medium will become too strong, which is unfavourable. If the lower limit of the condition (6) is eceeded, the refracting power of the medium will become excessively weak, and the reason for the respective refracting powers to be set to be positive, negative and positive, respectively will be lost.

The condition (5) is established with the establishments of the conditions (4) and (6). If the upper limit thereof is exceeded, the refracting power of the second refracting surface will be excessively strong so that it will be impossible to correct aberrations with good balance.

If the lower limit thereof is exceeded, the refracting power of the second surface will become excessively weak which would have to be compensated for by the first surface. This causes an imbalance in power which results in an increase of spherical aberration.

Moreover, it is desirable for $r_1/r_2$ to satisfy the following condition (7):

$$0.6 < -r_1/r_2 \quad (7)$$

If this condition is not satisfied, the refracting power will become concentrated in the medium. In this state, if it is attempted to correct the under-corrected spherical aberration and coma which are generated in the medium, astigmatism will deteriorate, so that it will be impossible to correct these aberrations with good balance.

As is mentioned above, when the basic shape of the lens is determined, the high-order coefficients of the refractive index distribution are arranged and the refracting surface is formed aspherically so that aberrations can be well-corrected. At this time, if the high-order coefficients of the refractive index distribution have extraordinarily large values, the control in manufacture will become difficult. In practice, it is necessary to satisfy the following condition (8):

$$|n_0 n_2 4 n_1^2| < 1000 \qquad (8)$$

If this condition (8) is not satisfied, the high-order coefficients will become large, which is undesirable in practice.

BRIEF DESCRIPTION OF THE DRAWINGS

FIGS. 7 through 17, respectively, show graphs illustrating aberration curves of Embodiments 1 through 11 of the GRIN lens according to the present invention.

DETAILED DESCRIPTION OF THE PREFERRED EMBODIMENTS

Figure 1:
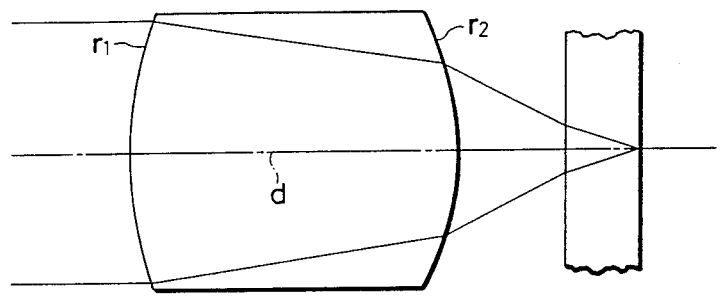
FIG. 1 shows a sectional view of Embodiments 1, 4, 5 and 6 of the GRIN lens according to the present invention.

Preferred Embodiments of the GRIN lens according to the present invention as described above are shown below:

---

Embodiment 1
  $f = 1.0$                              $NA = 0.47$
  Image Height (IH) = 0.0217,            $WD = 0.384$
  $r_1 = 1.329$
    $d = 1.184$        $n_0 = 1.5$       $n_1 = -0.18845$
  $r_2 = -1.026$                         $n_2 = 0.48548 \times 10^{-1}$
  $P_1 = -0.0617$    $E_1 = 0.33929 \times 10^{-2}$   $F_1 = -0.15788$
  $G_1 = -0.53064$
    $(n_0 - 1)f/r_1 = 0.38$              $(n_0 - 1)f/r_2 = -0.49$
    $-r_1/r_2 = 1.30$                    $|n_0 n_2/4 n_1^2| = 0.51$ Embodiment 2
  $f = 1.0$                              $NA = 0.47$
  $IH = 0.0217$                          $WD = 0.355$
  $r_1 = 0.824$
    $d = 0.978$        $n_0 = 1.65$      $n_1 = -0.25718 \times 10^{-1}$
  $r_2 = -1.955$                         $n_2 = 0.22661$
  $P_1 = -0.0036$    $E_1 = 0.20545$    $F_1 = -0.40244 \times 10^{-1}$
  $G_1 = -0.18874$
    $(n_0 - 1)f/r_1 = 0.79$              $(n_0 - 1)f/r_2 = -0.33$
    $-r_1/r_2 = 1.30$                    $|n_0 n_2/4 n_1^2| = 141.3$ Embodiment 3
  $f = 1.0$                              $NA = 0.47$
  $IH = 0.0217$                          $WD = 0.533$
  $r_1 = 0.673$
    $d = 0.652$        $n_0 = 1.65$      $n_1 = 0.35074$
  $r_2 = -1.089$                         $n_2 = 1.197$
  $P_1 = 0.7485$     $E_1 = -0.73361 \times 10^{-1}$   $F_1 = -1.2325$
  $G_1 = -2.7273$
    $(n_0 - 1)f/r_1 = 0.97$              $(n_0 - 1)f/r_2 = -0.60$
    $-r_1/r_2 = 0.62$                    $|n_0 n_2/4 n_1^2| = 4.01$ Embodiment 4
  $f = 1.0$                              $NA = 0.47$
  $IH = 0.0217$                          $WD = 0.350$
  $r_1 = 1.492$
    $d = 1.268$        $n_0 = 1.5$       $n_1 = -0.21592$
  $r_2 = -1.105$                         $n_2 = 0.14707 \times 10^{-1}$
  $P_1 = 0.8407$     $E_1 = -0.5045 \times 10^{-1}$   $F_1 = -0.11761$
  $G_1 = -0.41134$
    $(n_0 - 1)f/r_1 = 0.34$              $(n_0 - 1)f/r_2 = -0.45$
    $-r_1/r_2 = 1.35$                    $|n_0 n_2/4 n_1^2| = 0.12$ Embodiment 5
  $f = 1.0$                              $NA = 0.47$
  $IH = 0.0217$                          $WD = 0.407$
  $r_1 = 1.948$
    $d = 1.334$        $n_0 = 1.65$      $n_1 = -0.16637$
  $r_2 = -1.212$                         $n_2 = 0.19035 \times 10^{-1}$
  $P_1 = -0.8319$    $E_1 = -0.64927 \times 10^{-1}$  $F_1 = -0.13994$
  $G_1 = -0.30808$
    $(n_0 - 1)f/r_1 = 0.33$              $(n_0 - 1)f/r_2 = -0.54$
    $-r_1/r_2 = 1.61$                    $|n_0 n_2/4 n_1^2| = 0.28$ Embodiment 6
  $f = 1.0$                              $NA = 0.47$
  $IH = 0.0217$                          $WD = 0.425$
  $r_1 = 2.304$
    $d = 1.409$        $n_0 = 1.75$      $n_1 = -0.14698$
  $r_2 = -1.318$                         $n_2 = 0.15155 \times 10^{-1}$
  $P_1 = 1.0795$     $E_1 = -0.10167$   $F_1 = -0.12656$
  $G_1 = -0.23402$
    $(n_0 - 1)f/r_1 = 0.33$              $(n_0 - 1)f/r_2 = -0.57$
    $-r_1/r_2 = 1.75$                    $|n_0 n_2/4 n_1^2| = 0.31$ Embodiment 7
  $f = 1.0$                              $NA = 0.47$
  $IH = 0.0217$                          $WD = 0.326$
  $r_1 = 0.629$
    $d = 0.898$        $n_0 = 1.63891$   $n_1 = 0.1169$
  $r_2 = -2.256$                         $n_2 = 0.37458$
  $P_1 = 0.5929$     $E_1 = -.79635 \times 10^{-1}$   $F_1 = -0.93793 \times 10^{-1}$
  $P_2 = 11.1960$    $E_2 = 1.0439$     $F_2 = 0.22858$
    $(n_0 - 1)f/r_1 = 1.02$              $(n_0 - 1)f/r_2 = -0.28$
    $-r_1/r_2 = 0.28$                    $|n_0 n_2/4 n_1^2| = 11.23$ Embodiment 8
  $f = 1.0$                              $NA = 0.47$
  $IH = 0.0217$                          $WD = 0.326$
  $r_1 = 0.641$
    $d = 0.903$        $n_0 = 1.76137$   $n_1 = 0.26565$
  $r_2 = -2.298$                         $n_2 = 0.46556$
  $P_1 = 0.4856$     $E_1 = 0.72935 \times 10^{-1}$   $F_1 = -0.90985 \times 10^{-1}$
  $P_2 = -26.6506$   $E_2 = 0.68882$    $F_2 = -0.29421$
    $(n_0 - 1)f/r_1 = 1.19$              $(n_0 - 1)f/r_2 = -0.33$
    $-r_1/r_2 = 0.28$                    $|n_0 n_2/4 n_1^2| = 2.91$ Embodiment 9
  $f = 1.0$                              $NA = 0.47$
  $IH = 0.0217$                          $WD = 0.303$
  $r_1 = 0.727$
    $d = 1.005$        $n_0 = 1.50254$   $n_1 = -0.12421$
  $r_2 = -1.910$                         $n_2 = 0.59222 \times 10^{-1}$
  $P_1 = 0.1849$     $E_1 = 0.23647$    $F_1 = 0.15196$
  $G_1 = 0.15752$
  $P_2 = -20.2068$   $E_2 = 0.25202$    $F_2 = -0.51597$
    $(n_0 - 1)f/r_1 = 0.69$              $(n_0 - 1)f/r_2 = -0.26$
    $-r_1/r_2 = 0.38$                    $|n_0 n_2/4 n_1^2| = 1.44$ Embodiment 10
  $f = 1.0$                              $NA = 0.47$
  $IH = 0.0217$                          $WD = 0.326$
  $r_1 = 0.681$
    $d = 0.946$        $n_0 = 1.5$       $n_1 = -0.92432 \times 10^{-1}$
  $r_2 = -1.828$                         $n_2 = 0.11014$
  $P_1 = 0.2684$     $E_1 = 0.24188$    $F_1 = 0.15376$
  $G_1 = 0.25946$
  $P_2 = -13.3374$   $E_2 = 0.3981$     $F_2 = -0.40139$
    $(n_0 - 1)f/r_1 = 0.73$              $(n_0 - 1)f/r_2 = -0.27$
    $-r_1/r_2 = 0.37$                    $|n_0 n_2/4 n_1^2| = 4.83$ Embodiment 11
  $f = 1.0$                              $NA = 0.53$
  $IH = 0.0245$                          $WD = 0.441$
  $r_1 = 7.901$
    $d = 1.425$        $n_0 = 1.65$      $n_1 = -0.26535$
  $r_2 = -1.529$                         $n_2 = -0.4705 \times 10^{-1}$ -continued

| $P_1 = 56.1512$ | $E_1 = -0.2261$ | $F_1 = -0.18002$ |
|---|---|---|
| $G_1 = -0.40507$ | | |
| $P_2 = -4.2631$ | $E_2 = -0.22154$ | $F_2 = 0.18119$ |
| $(n_0 - 1)f/r_1 = 0.08$ | $(n_0 - 1)f/r_2 = -0.43$ | |
| $-r_1/r_2 = 5.17$ | $\|n_0 n_2/4n_1^2\| = 0.27$ | |

In all of the above Embodiments, the refractive index distribution is expressed by the formula given in the foregoing description.

The shape of an aspherical surface is expressed by the following equation:

$$x = \frac{Cr^2}{1 + \sqrt{1 - PC^2 r^2}} + Er^4 + Fr^6 + Gr^8 + \ldots$$

where C represents the curvature (the reciprocal of the radius of curvature) of the vertex portion of the aspherical surface, P represents the constant of cone, and E, F, G, ... respectively represent the 4th-, 6th-, 8th-, ... order coefficients of r, $P_1$, $E_1$, $F_1$, $G_1$, ... represent the coefficients for the incident side surface, and $P_2$, $E_2$, $F_2$, $G_2$, ... represent the coefficients the for the exit side surface.

Among the above mentioned Embodiments of the GRIN lens according to the present invention, Embodiments 1 through 10 are designed such that aberrations generated by the disk of which the thickness is 0.2609 and the refractive index is 1.58 are taken into account. Embodiment 11 is designed such that aberrations generated by the disk of which the thickness is 0.2943 and the refractive index is 1.58 are taken into account. The values of $n_0$, $n_1$, $n_2$ and the refractive index of the disk are for the wave length $\lambda = 800$ nm, and all of Embodiments are designed in such a way that aberrations become minimum at this wave length. The data of respective Embodiments are values normalized with the focal length as being 1.0.

In Embodiments 1, 4, 5 and 6 of the GRIN lens according to the present invention, as shown in FIG. 1, the curvature of the incident side refracting surface is weaker than that of the exit side refracting surface. The incident side surface is aspherical.

Figure 2:
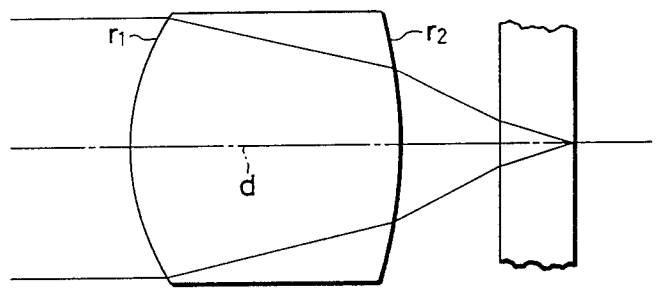
FIG. 2 shows a sectional view of Embodiment 2 of the GRIN lens according to the present invention.

In Embodiment 2 of the GRIN lens according to the present invention, as shown in FIG. 2, the curvature of the exit side refracting surface is weaker than that of the incident side refracting surface. Also, in this Embodiment, the incident side surface is aspherical.

Figure 3:
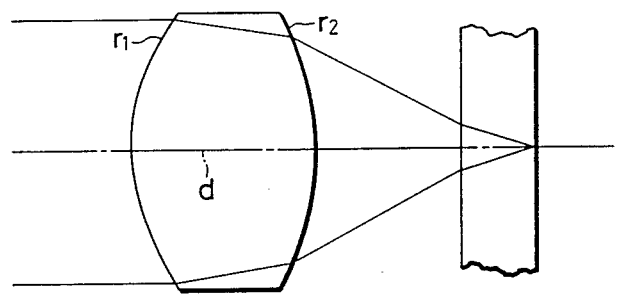
FIG. 3 shows a sectional view of Embodiment 3 of the GRIN lens according to the present invention.

In Embodiment 3 of the GRIN lens according to the present invention, as shown in FIG. 3, the incident side refracting surface is aspherical. The lens of this Embodiment has a sufficiently large working distance, and constitutes the diverging GRIN lens.

Figure 4:
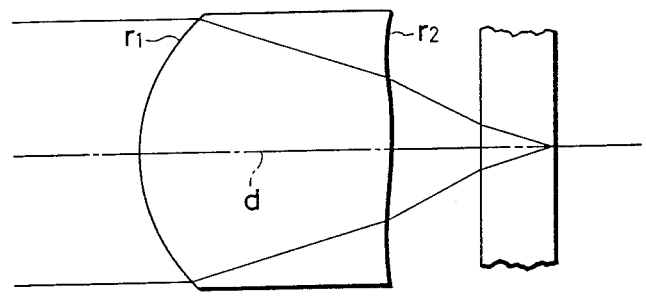
FIG. 4 shows a sectional view of Embodiments 7 and 8 of the GRIN lens according to the present invention.

The lenses of Embodiments 7 and 8 according to the present invention, as shown in FIG. 4, comprise the diverging GRIN lens wherein both the incident side and the exit side refracting surfaces are aspherical.

Figure 5:
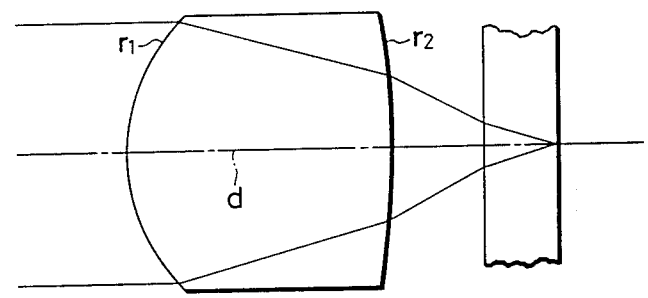
FIG. 5 shows a sectional view of Embodiments 9 and 10 of the GRIN lens according to the present invention.

The lenses of Embodiments 9 and 10 according to the present invention, as shown in FIG. 5, comprise converging GRIN lens wherein both the refracting surfaces are aspherical.

Figure 6:
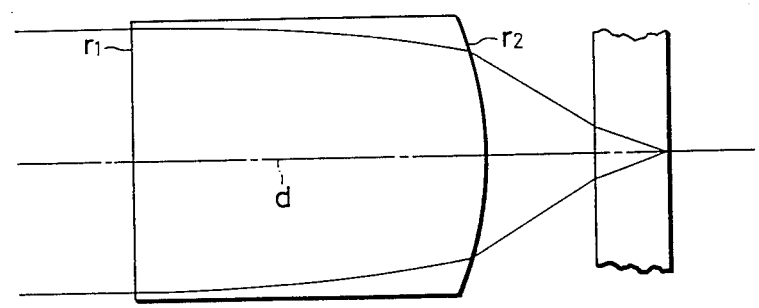
FIG. 6 shows a sectional view of Embodiment of the GRIN lens according to the present invention.
Figure 7:
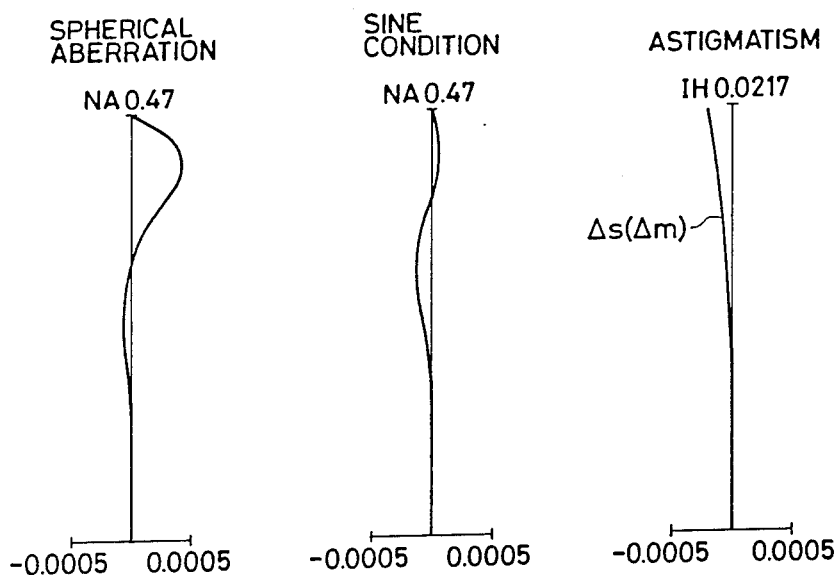
Figure 8:
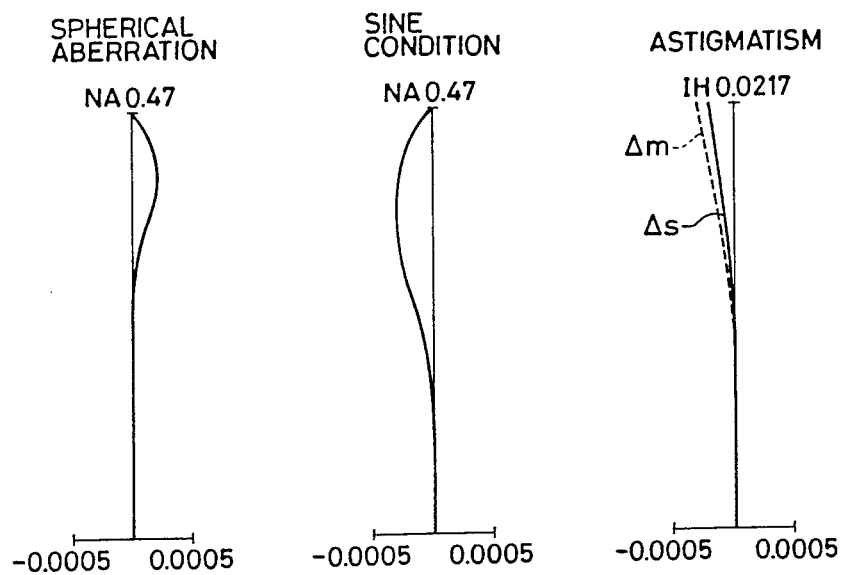
Figure 9:
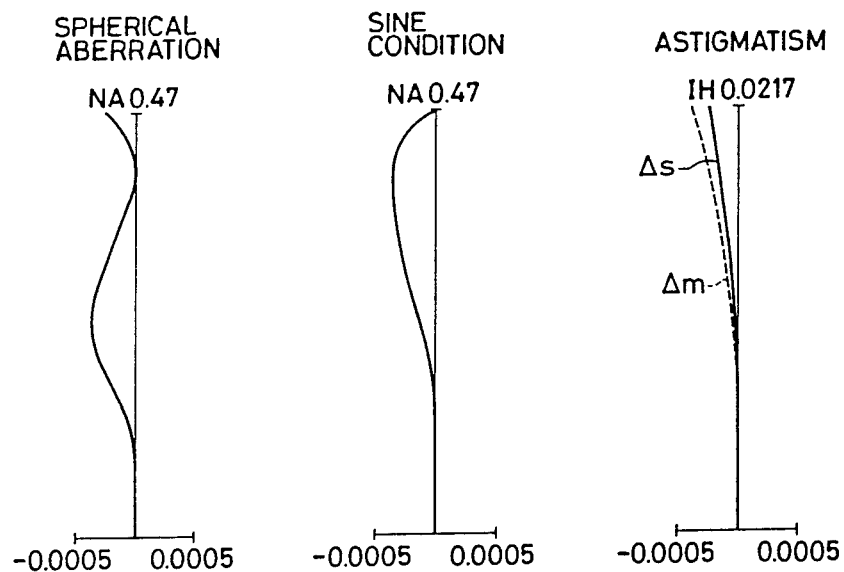
Figure 10:
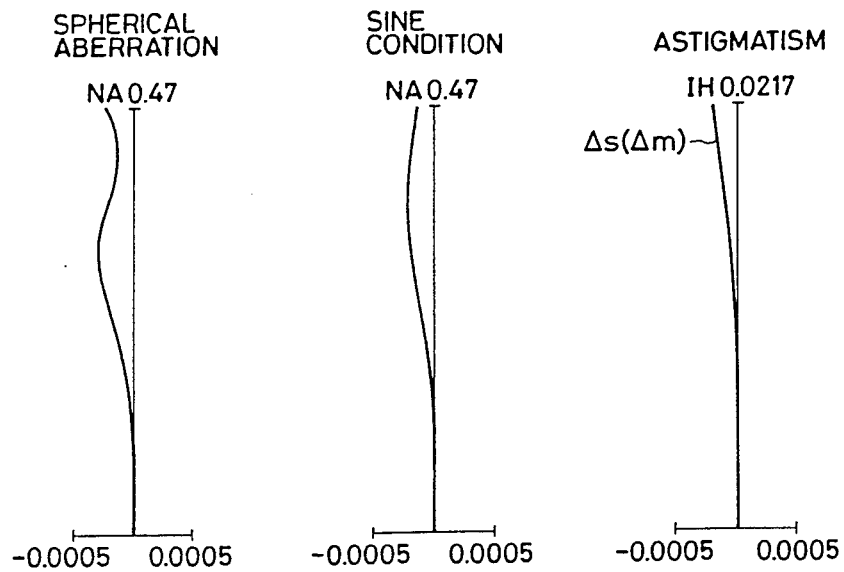
Figure 13:
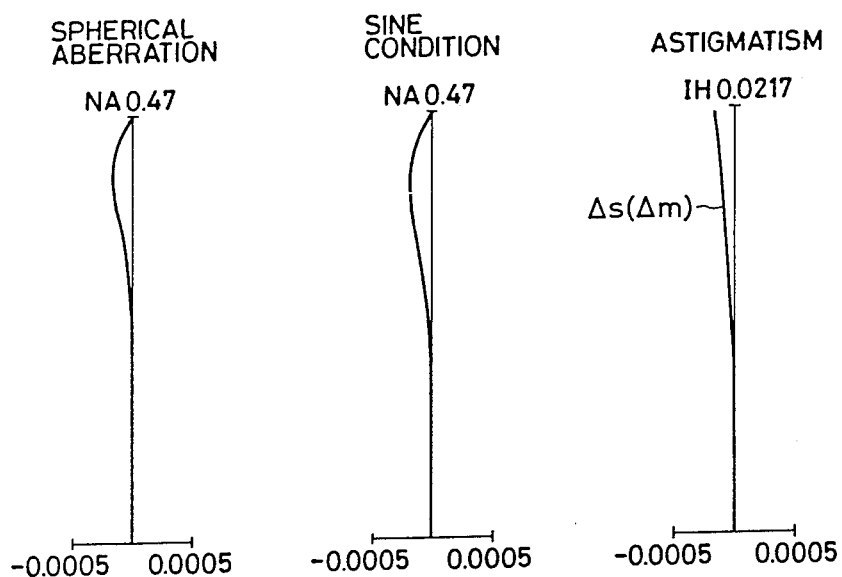
Figure 14:
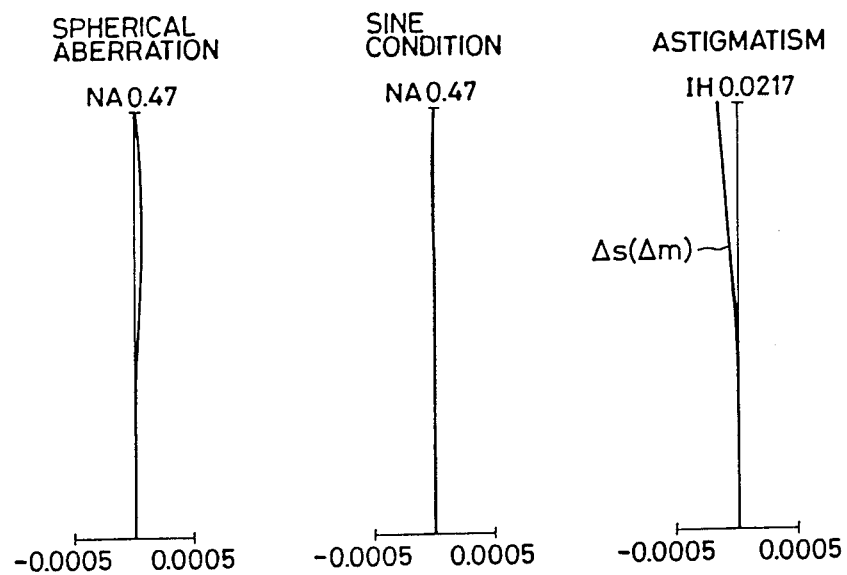
Figure 15:
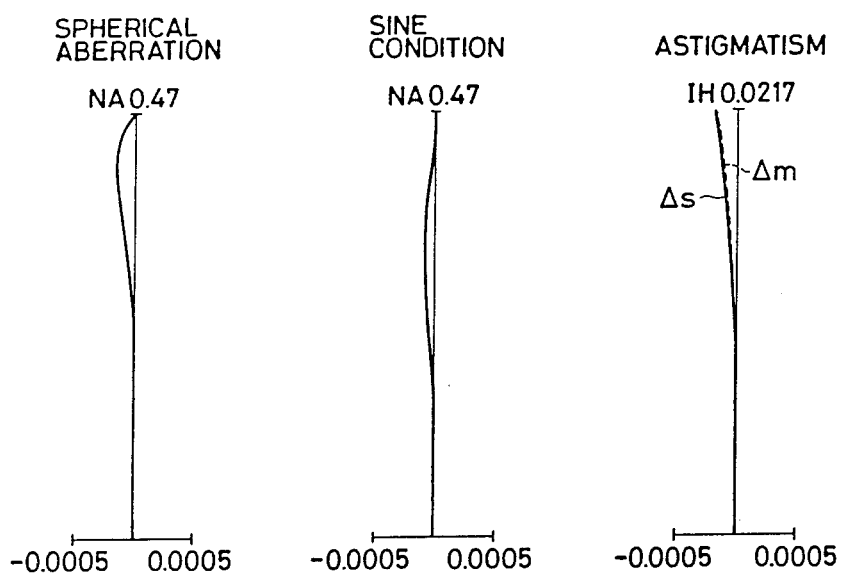
Figure 16:
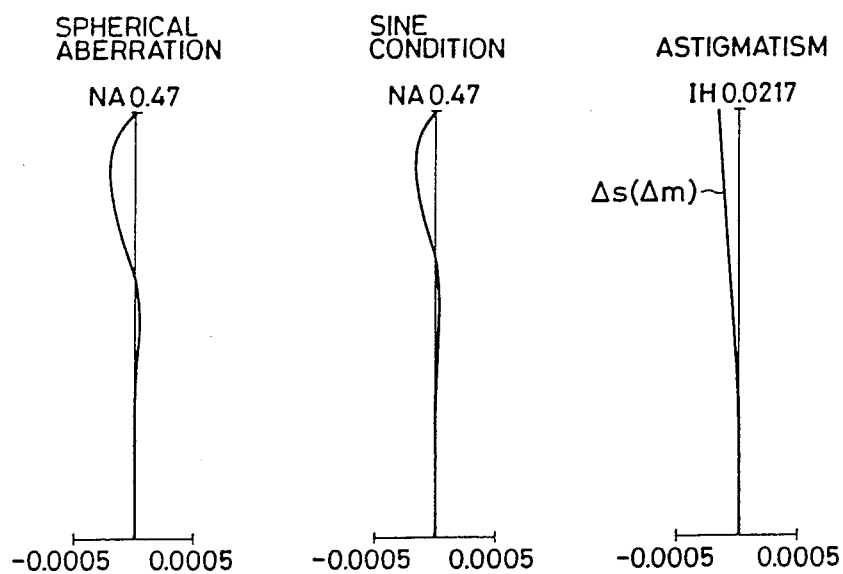

In Embodiment 11 of the GRIN lens according to the present invention, as shown in FIG. 6, both the refracting surfaces are aspherical. Though N.A. is as large as 0.53, this lens has a sufficiently large working distance, and aberrations including off-axial aberrations are well-corrected.

Various aberrations of Embodiments 1 through 11 of the GRIN lens according to the present invention are shown in FIGS. 7 through 17. In each of Embodiments, aberrations are well-corrected, especially astigmatism is corrected excellently because both the tangential and meridional image surfaces are almost overlapped with each other.

As is explained above in detail and is evident from each of the preferred Embodiments, it is possible according to the present invention, to obtain the GRIN lens with wide visual field and high capacity in which not only spherical aberration and coma but also astigmatism is well-corrected while the lens has a sufficiently large working distance. And, as shown in Embodiments 1 through 6 of the GRIN lens according to the present invention, it is possible to obtain the GRIN lens with high capacity though there is only one aspherical surface, which means advantages in manufacture thereof.

I claim:

1. A graded refractive index lens in which the refractive index n at the radial distance r from the optical axis is expressed by the formula shown below on the premise that $n_0$ represents the refractive index on the optical axis of said lens, $n_1$, $n_2$, ... respectively represent the 2nd-, 4th-, ... order coefficients:

$$n = n_0 + n_1 r^2 + n_2 r^4 + \ldots$$

and in which the shapes of both an incident side refracting surface and an exit side refracting surface of said lens have positive refracting powers and at least said incident side refracting surface is aspherical and is expressed by equation (A) shown below, and said graded refractive index lens satisfies the following conditions (1), (2) and (3):

$$x = \frac{Cr^2}{1 + \sqrt{1 - PC^2 r^2}} = Er^4 + Fr^6 + Gr^8 + \ldots \quad (A)$$

$$0 < (n_0 - 1)f/r_1 < 0.4 \quad (1)$$

$$0.38 < -(n_0 - 1)f/r_2 < 0.65 \quad (2)$$

$$-0.3 < n_1 f^2 < -0.1 \quad (3)$$

$$0 < (n_0 - 1)f/r_1 < 0.4 \quad (1)$$

$$0.38 < -(n_0 - 1)f/r_2 < 0.65 \quad (2)$$

$$-0.3 < n_1 f^2 < -0.1 \quad (3)$$

where C represents the curvature of the vertex portion of said aspherical surface, P represents the constant of cone, E, F, G, ... respectively represent the 4th-, 6th-, 8th-, ... order coefficients of r, $r_1$ represents the radius of curvature of the incident side refracting surface of said lens, $r_2$ represents the radius of curvature of the exit side refracting surface of said lens and f represents the focal length of said lens.

2. A graded refractive index lens according to claim 1, further satisfying the following condition:

$$0.6 < -r_1/r_2$$

3. A graded refractive index lens according to claim 1, further satisfying the following condition:

$$|n_0 n_2 / 4 n_1^2| < 1000$$

4. A graded refractive index lens according to claim 1, said incident side refracting surface being an aspherical surface, wherein said graded refractive index lens has the following numerical data:

| | | |
|---|---|---|
| f = 1.0 | NA = 0.47 | |
| IH = 0.0217 | WD = 0.384 | |
| $r_1$ = 1.329 | | |
| d = 1.184 | $n_0$ = 1.5 | $n_1$ = −0.18845 |
| $r_2$ = −1.026 | | $n_2$ = 0.48548 × $10^{-1}$ |
| $P_1$ = −0.0617 | $E_1$ = 0.33929 × $10^{-2}$ | $F_1$ = −0.15788 |
| $G_1$ = −0.53064 | | |
| $(n_0 - 1)f/r_1$ = 0.38 | $(n_0 - 1)f/r_2$ = −0.49 | |
| $-r_1/r_2$ = 1.30 | $|n_0 n_2/4n_1^2|$ = 0.51 | |

5. A graded refractive index lens according to claim 1, said incident side refracting surface being an aspherical surface, wherein said graded refractive index lens has the following numerical data:

| | | |
|---|---|---|
| f = 1.0 | NA = 0.47 | |
| IH = 0.0217 | WD = 0.350 | |
| $r_1$ = 1.492 | | |
| d = 1.268 | $n_0$ = 1.5 | $n_1$ = −0.21592 |
| $r_2$ = −1.105 | | $n_2$ = 0.14707 × $10^{-1}$ |
| $P_1$ = 0.8407 | $E_1$ = −0.5045 × $10^{-1}$ | $F_1$ = −0.11761 |
| $G_1$ = −0.41134 | | |
| $(n_0 - 1)f/r_1$ = 0.34 | $(n_0 - 1)f/r_2$ = −0.45 | |
| $-r_1/r_2$ = 1.35 | $|n_0 n_2/4n_1^2|$ = 0.12 | |

6. A graded refractive index lens according to claim 1, said incident side refracting surface being an aspherical surface, wherein said graded refractive index lens has the following numerical data:

| | | |
|---|---|---|
| f = 1.0 | NA = 0.47 | |
| IH = 0.0217 | WD = 0.407 | |
| $r_1$ = 1.948 | | |
| d = 1.334 | $n_0$ = 1.65 | $n_1$ = −0.16637 |
| $r_2$ = −1.212 | | $n_2$ = 0.19035 × $10^{-1}$ |
| $P_1$ = −0.8319 | $E_1$ = −0.64927 × $10^{-1}$ | $F_1$ = −0.13994 |
| $G_1$ = −0.30808 | | |
| $(n_0 - 1)f/r_1$ = 0.33 | $(n_0 - 1)f/r_2$ = −0.54 | |
| $-r_1/r_2$ = 1.61 | $|n_0 n_2/4n_1^2|$ = 0.28 | |

7. A graded refractive index lens according to claim 1, said incident side refracting surface being an aspherical surface, wherein said graded refractive index lens has the following numerical data:

| | | |
|---|---|---|
| f = 1.0 | NA = 0.47 | |
| IH = 0.0217 | WD = 0.425 | |
| $r_1$ = 2.304 | | |
| d = 1.409 | $n_0$ = 1.75 | $n_1$ = −0.14698 |
| $r_2$ = −1.318 | | $n_2$ = 0.15155 × $10^{-1}$ |
| $P_1$ = 1.0795 | $E_1$ = −0.10167 | $F_1$ = −0.12656 |
| $G_1$ = −0.23402 | | |
| $(n_0 - 1)f/r_1$ = 0.33 | $(n_0 - 1)f/r_2$ = −0.57 | |
| $-r_1/r_2$ = 1.75 | $|n_0 n_2/4n_1^2|$ = 0.31 | |

8. A graded refractive index lens according to claim 1, both the refracting surfaces geing aspherical surfaces, wherein said graded refractive index lens has the following numerical data:

| | | |
|---|---|---|
| f = 1.0 | NA = 0.53 | |
| IH = 0.0245 | WD = 0.441 | |
| $r_1$ = 7.901 | | |
| d = 1.425 | $n_0$ = 1.65 | $n_1$ = −0.26535 |
| $r_2$ = −1.529 | | $n_2$ = −0.4705 × $10^{-1}$ |
| $P_1$ = 56.1512 | $E_1$ = −0.2261 | $F_1$ = −0.18002 |
| $G_1$ = −0.40507 | | |
| $P_2$ = −4.2631 | $E_2$ = −0.22154 | $F_2$ = 0.18119 |
| $(n_0 - 1)f/r_1$ = 0.08 | $(n_0 - 1)f/r_2$ = −0.43 | |
| $-r_1/r_2$ = 5.17 | $|n_0 n_2/4n_1^2|$ = 0.27 | |

9. A graded refractive index lens in which the refractive index n at the radial distance r from the optical axis is expressed by the formula shown below on the premise that $n_0$ represents the refractive index on the optical axis of said lens, $n_1$, $n_2$, . . . respectively represent the 2nd-, 4th-, . . . order coefficients:

$$n = n_0 + n_1 r^2 + n_2 r^4 + \ldots$$

and in which the shapes of both an incident side refracting surface and an exit side refracting surface of said lens have positive refracting powers and at least said incident side refracting surface is aspherical and is expressed by Equation (A) shown below, and said graded refractive index lens satisfies the following conditions (4), (5) and (6):

$$x = \frac{Cr^2}{1 + \sqrt{1 - PC^2 r^2}} = Er^4 + Fr^6 + Gr^8 + \ldots \quad (A)$$

$$0.9 < (n_0 - 1)f/r_1 < 1.3 \quad (4)$$

$$0.25 < -(n_0 - 1)f/r_2 < 0.7 \quad (5)$$

$$0.1 < n_1 f^2 < 0.4 \quad (6)$$

$$0.9 < (n_0 - 1)f/r_1 < 1.3 \quad (4)$$

$$0.25 < -(n_0 - 1)f/r_2 < 0.7 \quad (5)$$

$$0.1 < n_1 f^2 < 0.4 \quad (6)$$

where C represents the curvature of the vertex portion of said aspherical surface, P represents the constant of cone, E, F, G, . . . respectively represent the 4th-, 6th-, 8th-, . . . order coefficients of r, $r_1$ represents the radius of curvature of the incident side refracting surface of said lens, $r_2$ represents the radius of curvature of the exit side refracting surface of said lens and f represents the focal length of said lens.

10. A graded refractive index lens according to claim 9, further satisfying the following condition:

$$|n_0 n_2/4n_1^2| < 1000$$

11. A graded refractive index lens according to claim 9, said incident side refracting surface being an aspherical surface, wherein said graded refractive index lens has the following numerical data:

| | | |
|---|---|---|
| f = 1.0 | NA = 0.47 | |
| IH = 0.0217 | WD = 0.533 | |
| $r_1$ = 0.673 | | |
| d = 0.652 | $n_0$ = 1.65 | $n_1$ = 0.35074 |
| $r_2$ = −1.089 | | $n_2$ = 1.197 |
| $P_1$ = 0.7485 | $E_1$ = −0.73361 × $10^{-1}$ | $F_1$ = −1.2325 |
| $G_1$ = −2.7273 | | |
| $(n_0 - 1)f/r_1$ = 0.97 | $(n_0 - 1)f/r_2$ = −0.60 | |
| $-r_1/r_2$ = 0.62 | $|n_0 n_2/4n_1^2|$ = 4.01 | |

12. A graded refractive index lens according to claim 9, both the refracting surfaces being aspherical surfaces, wherein said graded refractive index lens has the following numerical data:

| | | |
|---|---|---|
| f = 1.0 | NA = 0.47 | |
| IH = 0.0217 | WD = 0.326 | |
| $r_1$ = 0.629 | | |
| d = 0.898 | $n_0$ = 1.63891 | $n_1$ = 0.1169 |
| $r_2$ = −2.256 | | $n_2$ = 0.37458 |
| $P_1$ = 0.5929 | $E_1 = 0.79635 \times 10^{-1}$ | $F_1 = -0.93793 \times 10^{-1}$ |
| $P_2$ = 11.1960 | $E_2$ = 1.0439 | $F_2$ = 0.22858 |
| $(n_0 - 1)f/r_1$ = 1.02 | $(n_0 - 1)f/r_2$ = −0.28 | |
| $-r_1/r_2$ = 0.28 | $\|n_0 n_2 / 4 n_1^2\|$ = 11.23 | |

13. A graded refractive index lens according to claim 9, both the refracting surfaces being aspherical surfaces, wherein said graded refractive index lens has the following numerical data:

| | | |
|---|---|---|
| f = 1.0 | NA = 0.47 | |
| IH = 0.0217 | WD = 0.326 | |
| $r_1$ = 0.641 | | |
| d = 0.903 | $n_0$ = 1.76137 | $n_1$ = 0.26565 |
| $r_2$ = −2.298 | | $n_2$ = 0.46556 |
| $P_1$ = 0.4856 | $E_1 = 0.72935 \times 10^{-1}$ | $F_1 = -0.90985 \times 10^{-1}$ |
| $P_2$ = −26.6506 | $E_2$ = 0.68882 | $F_2$ = −0.29421 |
| $(n_0 - 1)f/r_1$ = 1.19 | $(n_0 - 1)f/r_2$ = −0.33 | |
| $-r_1/r_2$ = 0.28 | $\|n_0 n_2 / 4 n_1^2\|$ = 2.91 | |

14. A graded refractive index lens in which the refractive index n at the radial distance r from the optical axis is expressed by the formula shown below on the premise that $n_0$ represents the refractive index on the optical axis of said lens, $n_1$, $n_2$, ... respectively represent the 2nd-, 4th-, ... order coefficients:

$$n = n_0 + n_1 r^2 + n_2 r^4 + \ldots$$

and in which an incident side refracting surface is aspherical and is expressed by Equation (A) shown below, and said graded refractive index lens has the following numerical data:

$$x = \frac{Cr^2}{1 + \sqrt{1 - PC^2 r^2}} + Er^4 + Fr^6 + Gr^8 + \ldots \quad \text{(A)}$$

| | | |
|---|---|---|
| f = 1.0 | NA = 0.47 | |
| IH = 0.0217 | WD = 0.355 | |
| $r_1$ = 0.824 | | |
| d = 0.978 | $n_0$ = 1.65 | $n_1 = -0.25718 \times 10^{-1}$ |
| $r_2$ = −1.955 | | $n_2$ = 0.22661 |
| $P_1$ = −0.0036 | $E_1$ = 0.20545 | $F_1 = -0.40244 \times 10^{-1}$ |
| $(n_0 - 1)f/r_1$ = 0.79 | $(n_0 - 1)f/r_2$ = −0.33 | |
| $-r_1/r_2$ = 0.42 | $\|n_0 n_2/4 n_1^2\|$ = 141.3 | |
| $G_1$ = −0.18874 | | | where C represents the curvature of the vertex portion of said aspherical surface, P represents the constant of cone, E, F, G, ... respectively represent the 4th-, 6th-, 8th-, ... order coefficients of r, $r_1$ represents the radius of curvature of the incident side refracting surface of said lens, $r_2$ represents the radius of curvature of the exit side refracting surface of said lens and f represents the focal length of said lens.

15. A graded refractive index lens in which the refractive index n at the radial distance r from the optical axis is expressed by the formula shown below on the premise that $n_0$ represents the refractive index on the optical axis of said lens, $n_1$, $n_2$, ... respectively represent the 2nd-, 4th-, ... order coefficients:

$$n = n_0 n_1 r^2 + n_2 r^4 + \ldots$$

and in which both refracting surfaces are aspherical and are expressed by Equation (A) shown below, and said graded refractive index lens has the following numerical data:

$$x = \frac{Cr^2}{1 + \sqrt{1 - PC^2 r^2}} + Er^4 + Fr^6 + Gr^8 \ldots \quad \text{(A)}$$

| | | |
|---|---|---|
| f = 1.0 | NA = 0.47 | |
| IH = 0.0217 | WD = 0.303 | |
| $r_1$ = 0.727 | | |
| d = 1.005 | $n_0$ = 1.50254 | $n_1$ = −0.12421 |
| $r_2$ = −1.910 | | $n_2 = 0.59222 \times 10^{-1}$ |
| $P_1$ = 0.1849 | $E_1$ = 0.23647 | $F_1$ = 0.15196 |
| $G_1$ = 0.15752 | | |
| $P_2$ = −20.2068 | $E_2$ = 0.25202 | $F_2$ = −0.51597 |
| $(n_0 - 1)f/r_1$ = 0.69 | $(n_0 - 1)f/r_2$ = −0.26 | |
| $-r_1/r_2$ = 0.38 | $\|n_0 n_2/4 n_1^2\|$ = 1.44 | | where C represents the curvature of the vertex portion of said aspherical surface, P represents the constant of cone, E, F, G, ... respectively represent the 4th-, 6th-, 8th-, ... order coefficients of r, $r_1$ represents the radius of curvature of the incident side refracting surface of said lens, $r_2$ represents the radius of curvature of the exit side refracting surface of said lens and f represents the focal length of said lens.

16. A graded refractive index lens in which the refractive index n at the radial distance r from the optical axis is expressed by the formula shown below on the premise that $n_0$ represents the refractive index on the optical axis of said lens, $n_1$, $n_2$, ... respectively represent the 2nd-, 4th-, ... order coefficients:

$$n = n_0 + n_1 r^2 + n_2 r^4 + \ldots$$

and in which both refracting surfaces are aspherical and are expressed by Equation (A) shown below, and said graded refractive index lens has the following numerical data:

$$x = \frac{Cr^2}{1 + \sqrt{1 - PC^2 r^2}} + Er^4 + Fr^6 + Gr^8 + \ldots \quad \text{(A)}$$

| | | |
|---|---|---|
| f = 1.0 | NA = 0.47 | |
| IH = 0.0217 | WD = 0.326 | |
| $r_1$ = 0.681 | | |
| d = 0.946 | $n_0$ = 1.5 | $n_1 = -0.92432 \times 10^{-1}$ |
| $r_2$ = −1.828 | | $n_2$ = 0.11014 |
| $P_1$ = 0.2684 | $E_1$ = 0.24188 | $F_1$ = 0.15376 |
| $G_1$ = 0.25946 | | |
| $P_2$ = −13.3374 | $E_2$ = 0.3981 | $F_2$ = −0.40139 |
| $(n_0 - 1)f/r_1$ = 0.73 | $(n_0 - 1)f/r_2$ = −0.27 | |
| $-r_1/r_2$ = 0.37 | $\|n_0 n_2/4 n_1^2\|$ = 4.83 | | where C represents the curvature of the vertex portion of said aspherical surface, P represents the constant of cone, E, F, G, ... respectively represent the 4th-, 6th-, 8th-, ... order coefficients of r, $r_1$ represents the radius of curvature of the incident side refracting surface of said lens, $r_2$ represents the radius of curvature of the exit side refracting surface of said lens and f represents the focal length of said lens.

* * * * *